Nov. 13, 1962 H. G. NOLD 3,063,622

MANUAL TAPE PUNCH

Filed Feb. 1, 1960 2 Sheets-Sheet 1

INVENTOR.
HENRY G. NOLD
BY Whittemore Hulbert & Belknap
ATTORNEYS

MANUAL TAPE PUNCH

Filed Feb. 1, 1960

*INVENTOR.*
HENRY G. NOLD
BY Whittemore Hulbert & Belknap
ATTORNEYS

United States Patent Office 3,063,622
Patented Nov. 13, 1962

3,063,622
MANUAL TAPE PUNCH

Henry G. Nold, St. Clair Shores, Mich., assignor to Holley Carburetor Company, Van Dyke, Mich., a corporation of Michigan Filed Feb. 1, 1960, Ser. No. 5,765
9 Claims. (Cl. 234—100)

The present invention refers to punching devices and relates more specifically to a highly portable manually operated tape perforator.

In the past, tape perforators have generally been relatively complicated and expensive, substantially stationary devices. In addition, many of the tape perforators of the past have required electric power for the operation thereof. Also, with previous tape perforators it has often been difficult or impossible to delete incorrect characters once they are punched on a tape.

It is, therefore, one of the purposes of the present invention to provide a highly portable tape perforator.

Another object is to provide a tape perforator which is manually operable.

Another object is to provide a tape perforator capable of use with different codes.

Another object is to provide a tape perforator including means for deleting previously perforated incorrect characters.

More specifically, it is an object to provide a manually operable tape perforator comprising means for holding and guiding punched and unpunched portions of a tape to be perforated, character selecting means for selecting a desired configuration of perforations to be punched, punching means to punch the tape with the selected perforations, and actuating means operable to cause the selected character to be punched.

Still more specifically it is an object to provide a tape perforator including a base having cavities therein for receiving perforated and unperforated portions of a tape to be perforated, punching apparatus secured to the base and operable to punch perforations in the tape as it passes between the base cavities, character selecting means operable to select the particular code character which it is desired to punch into the tape, actuating means operable to cause the punching apparatus to punch the tape with the selected character, and means for advancing the tape through the punching apparatus after each character has been punched in the tape.

Another object is to provide a tape perforator as set forth above including delete means associated with the punching apparatus and operable to punch a delete character over a character previously punched in the tape.

Another object is to provide a tape perforator as set forth above wherein the character selecting means includes a code drum which may be interchanged with other code drums so that tapes may be perforated with different codes.

Another object is to provide a tape perforator as set forth above which is simple in construction, economical to manufacture, and efficient in use.

Other objects and features of the invention will become apparent as the description proceeds especially when taken in conjunction with the accompanying drawings illustrating preferred embodiments of the invention, wherein.

Figure 1:
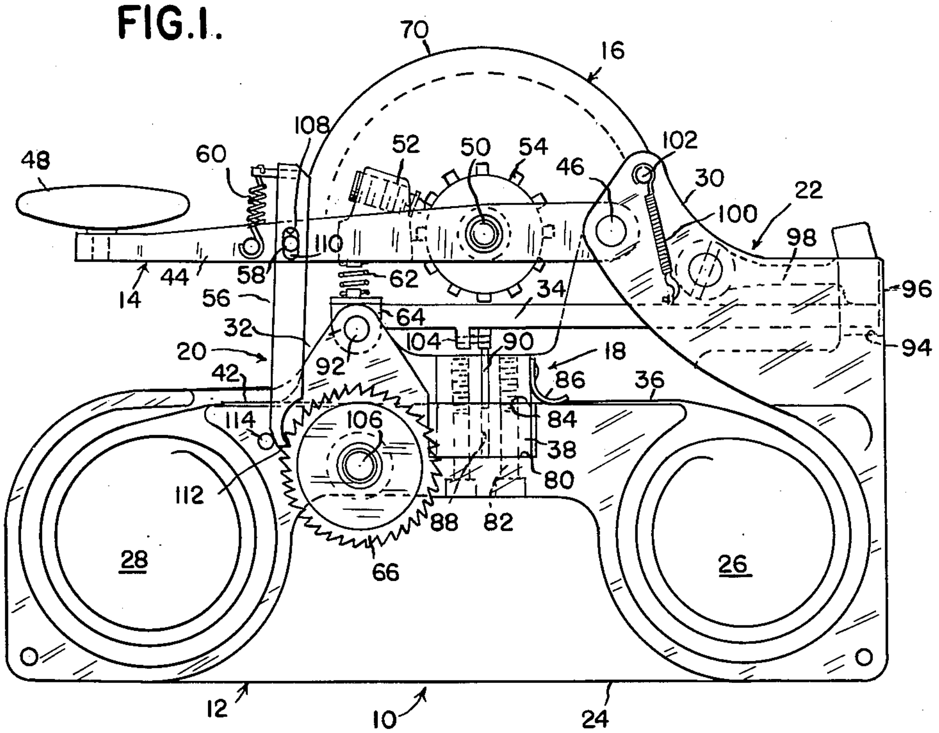
FIGURE 1 is an elevation view of a tape perforator according to the invention.

With reference to the figures, a particular embodiment of the tape perforator of the invention will now be disclosed.

The tape perforator generally indicated 10, as illustrated in the figures, comprises a base 12, actuating means 14, and character selecting means 16. The tape perforator 10 further includes punching apparatus 18 and tape advance mechanism 20.

In operation, tape to be perforated which is positioned in base 12 is threaded through perforating means 18 and over tape advance mechanism 20, as shown in FIGURE 1. After selection of a character to be perforated in the tape, the actuating means 14 may be operated to first cause the punching apparatus to perforate the tape with the selected character and then to cause the tape to be advanced a distance equal to the perforation spacing desired in the tape.

Delete means 22 are also provided in conjunction with the tape perforator 10. The delete means is operable to substitute a delete character for a previously punched incorrect character on a tape being perforated.

More specifically, the base 12 comprises a housing 24 having an unperforated tape cavity 26 at one end thereof and a perforated tape cavity 28 at the other end thereof, as best shown in FIGURE 1. The base 12 further includes upwardly extending ears or flanges 30 at each side thereof to which the actuating means 14, delete means 22, and part of the perforating means 18 are pivotally connected, as shown in the figures. Base 12 further includes ears or flanges 32 to which the operational levers 34 of the punching apparatus 18 are pivotally secured, as shown.

In operation, a coil of unperforated tape is positioned in the unperforated tape cavity 26 of housing 24, which tape is threaded across the top surface 36 of housing 12 through the punch block 38 of perforating means 18 across the feed pinwheel 40 of the tape advance mechanism 20 under the tape guide plate 42 which is secured to housing 24 and into the perforated tape cavity 28. As the tape is passed from the cavity 26 through the punch block 38 by means of tape advance mechanism 20 the tape is punched with the desired perforations to indicate particular characters of a selected code.

Actuating means 14 comprises an information lever 44 pivoted at one end by means of pin 46 to ears 30 of base 12. Knob 48 is provided on the other end of lever 44 to aid in the pivotal movement of the lever about pin 46 during a punching operation of the tape perforator 10.

As illustrated, the character selecting means 16 of the tape perforator 10 is rotatably secured to information lever 44 by means of shaft 50 extending perpendicularly thereto. Also, ball type spring loaded detent means 52 for the code drum 54 of the character selecting means is positioned on information lever 44, as shown.

Further, the advanced pawl 56 of the tape advance mechanism is attached to information lever 44 by means of pawl pin 58 and pawl spring 60 as illustrated. A return spring 62 for information lever 44 is provided acting between a bracket 64 on base 12 and the information lever 44, as illustrated.

In operation, when the information lever 44 is pivoted counterclockwise about pin 46, as illustrated in FIGURE 1, the advanced pawl 56 first engages the advanced ratchet 66 to advance the tape being perforated a distance equal to the desired spacing between characters perforated on the tape as will later be explained in more detail.

At the same time, the code drum 54 is likewise caused to rotate in a counterclockwise direction whereby the operational levers 34 are rotated clockwise to cause the punching apparatus to punch a selected set of perforations in the tape, as will also be explained in greater detail subsequently.

After the tape has been punched and the downward force removed from knob 48, the information lever 44 will be caused to rotate clockwise into the non-operating position thereof by means of spring 62, as will be understood by those familiar with the art.

Figures 2, 3:
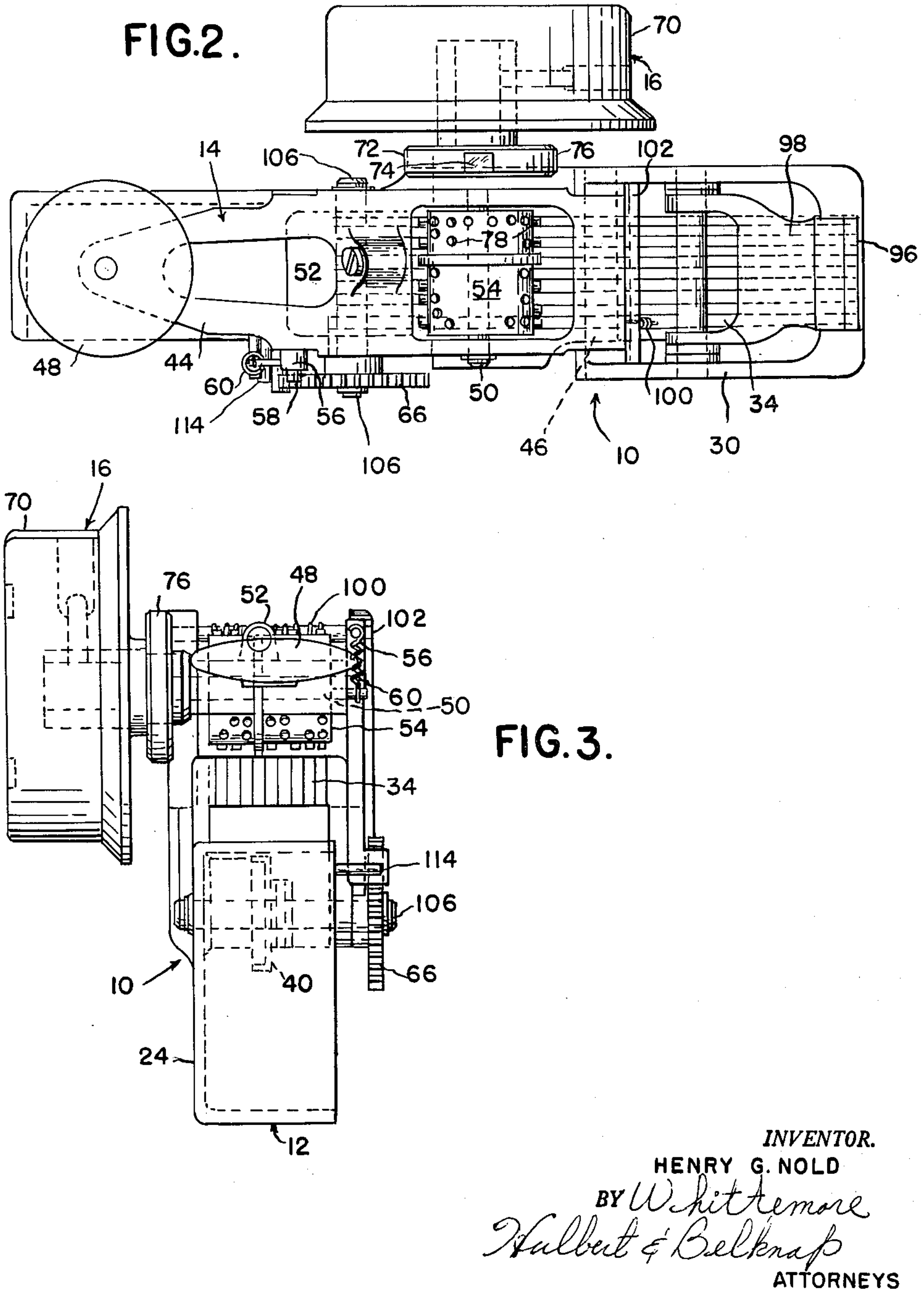
FIGURE 2 illustrates a top view of the tape perforator shown in FIGURE 1.
FIGURE 3 is an end view of the left end of the tape perforator shown in FIGURE 1.

The character selector means 16, shown best in FIGURES 2 and 3, comprises a character selector knob 70, a character indicating wheel 72 and code drum 54 secured to shaft 50 for rotation therewith. The character selector knob 70 is provided to rotate shaft 50 whereby the character indicating wheel 72 will likewise be rotated to indicate at window 74 of covering 76 for wheel 72 a particular one of the plurality of characters which it is possible to perforate on the paper tape with a selected code drum 54.

The code drum 54, as indicated, has a plurality of axial rows of pins 78 spaced angularly thereabout. Each of the rows of pins 78 indicate a particular character in a specific code for which the code drum has been designed. Different code drums may be used to perforate tape with differently coded characters. The code drum 54 as shown is operable to perforate different coded characters in a tape and provide a space position.

In operation, a code wheel of the desired code is placed on shaft 50 of the paper tape perforator 10 and aligned with the character indicating wheel 72. The character selector knob is then turned until a desired character appears at window 74. Thus, providing the code drum 54 has been properly orientated with respect to the character indicating wheel 72, the selected code character will be perforated in the paper tape on operation of the paper tape perforator 10 as will be subsequently set forth.

Perforating means 18 comprises punch block 38 secured in a recess 80 in base 12 by convenient means, such as bolts 82. Punch block 80 has a slot 84 therethrough through which the tape is passed in operation of the tape perforator 10. The tension spring 86 is also attached to the punch block 38 to guide the paper tape as it enters the slot 84 in the punch block. Punch block 38 also has a transverse row of centrally located through openings 88 in which perforating pins 90 are reciprocated to cause perforating of the paper tape on operation of the actuating means 14, as will be later set forth in more detail.

The perforating means further includes a set of operational levers 34 pivoted at one end by means of pin 92 to ears at 32 and adapted to abut stop surface 94 on base 24 when rotated clockwise and to abut the bar 96 on the actuating arm 98 of the delete means 22 on counterclockwise rotation thereof. The operational levers 34 are biased in the counterclockwise position by means of individual return springs 100 connected between each of the separate operational levers 34 and the pin 102 extending between ears 30. The perforating pins 90 are secured to projections 104 on the operational levers 34, as shown best in FIGURE 1.

It will be understood that a separate operational lever 34, perforating pin 90, and through opening 88 in punch block 80 will be provided for each pin position of the axially aligned pins on the code drum 54. Thus, in operation, as the code drum 54 is moved counterclockwise on counterclockwise pivoting of the information lever 44, those operational levers 34 which are contacted by pins on the code drum 54 will be caused to pivot clockwise in opposition to springs 100 to cause the perforating pins 90 to perforate the tape extending through the slot 84 in the punch block 38.

On subsequent movement of the information lever 44 in a clockwise direction, the operational levers 34 will be caused to return to their normal counterclockwise position by means of the return springs 100. Thus, the tape may be punched with the identical code characters appearing on the code wheel on actuation of lever 44.

The tape advancing mechanism 20 comprises the advance pawl 56, pawl pin 58 secured to the information lever 44, the pawl spring 60 also secured to the information lever 44 which are arranged to secure the pawl pin 56 to the information lever. The tape advance mechanism further includes the ratchet wheel 66, as best shown in FIGURE 1, mounted on shaft 106, journaled in base 12, and the feed pinwheel 40 also fixed to shaft 106 for rotation therewith.

In operation, as the information lever 44 is moved counterclockwise, the pawl 56 with the pawl pin 58 biased against the surface 108 of slot 110 in the pawl 56 by spring 60 is caused to contact one of the teeth of the ratchet wheel 56 and to advance the ratchet wheel until the end 112 of the pawl 56 wedges between the pawl stop pin 114 and the ratchet wheel 66, as shown in FIGURE 1, at which time the ratchet has been moved angularly a sufficient amount so that the feed pinwheel 40 has advanced the tape to be perforated a distance equal to the spacing desired between the perforations of the individual characters punched in the tape.

On clockwise movement of the information lever 44, the pawl 56 is caused to again set against surface 108 of slot 110 whereby it is cocked to cause subsequent indexing of the ratchet wheel 66 on counterclockwise movement of the information lever 44.

Thus, it will be seen that before each punching of the tape, as it passes through the punch block 38, the tape is indexed by the tape advance mechanism a distance equal to the desired space between the perforations of different characters by the punching apparatus.

Further, in accordance with the present invention, delete means 22 is provided to enable an operator of the tape perforator 10 to punch perforations in a tape which will indicate to a delete signal to a computer using the tape after it has been punched. Thus, an operator on realizing that the last punched character has been in error need merely rotate the delete bar 98 in a clockwise direction whereby each of the operational levers 34 are likewise rotated in a clockwise direction to cause each of the pins 90 to punch the tape before the tape has been indexed by the tape advancement mechanism previously indicated.

In over-all operation, when it is desired to perforate a tape with the tape perforator 10, a desired code drum is selected and secured to the shaft 50 for rotation therewith, the coiled tape to be perforated is placed in the unperforated tape cavity 26 and is subsequently threaded over the surface 36 of base 12 through the slot 84 in the punch block 38 and is then threaded by cooperation between a row of perforations therein and the pins of the feed pinwheel 40. The character selecting means is then set to the space position and the information lever 44 is rotated counterclockwise and released a number of times so that the tape advancing mechanism will cause the tape to be fed through the tape guide plate 42 into the perforated tape cavity 28.

The tape is now ready for punching with selected code characters. A particular character of the selected code, which it is desired to perforate the tape with, is selected by means of turning the selector knob 70 until the desired code character appears in the window 74 of the covering 76. The information lever 44 is then rotated counterclockwise as shown in FIGURE 1, as previously indicated, whereby the pins on the code drum 54 will depress particular ones of the operational levers 34 to cause the tape perforating pins 90 to be moved downward to perforate the tape with the desired coded character, as indicated by aligned pins on the code drum 54.

As indicated previously, should the last code character be recognized as incorrect, the delete bar need merely be rotated in a clockwise direction to cause all of the operational levers 34 to rotate in a clockwise direction to punch a delete character for the computer which will use the tape.

The tape is advanced before each punching operation occurs by means of the tape advance mechanism 20 including the feed pinwheel 40, ratchet 66, and pawl 56. The forward advance of the tape toward the perforated tape cavity 28 of the base 12 is halted before the pins 90 reach the tape in the slot 84 to prevent tearing of the tape. This is accomplished by means of the slot 110, spring 60 and the pawl stop 24 associated with the pawl 56 which permits downward movement of the pawl and indexing of the ratchet wheel 66 during only the first portion of the counterclockwise movement of the information lever 44. Punching of the tape takes place during the last portion of this counterclockwise movement of lever 44 and may be regulated by the length of the perforating pins 90.

Thus, applicant has disclosed a highly portable manually operable paper tape perforator having means for deleting previously punched incorrect characters which is simple in construction, economical to manufacture, and efficient in use.

The drawings and the foregoing specification constitute a description of the improved manual tape punch in such full, clear, concise and exact terms as to enable any person skilled in the art to practice the invention, the scope of which is indicated by the appended claims.

What I claim as my invention is:

1. A manual tape perforator comprising a support for supporting a tape to be perforated, apparatus also supported by said support operable to punch selected groups of perforations in the tape which perforations represent predetermined coded characters, means associated with said apparatus and operable to advance the tape a fixed distance at the start of a punching cycle of said apparatus, and delete means attached to said support and operable in conjunction with said apparatus to punch the tape with perforations representing a delete character without advancing the tape.

2. A portable manual tape perforator comprising a base for supporting a tape to be perforated, punching apparatus supported by said base for punching groups of perforations in the tape which perforations are aligned transversely of the tape and represent predetermined coded characters, character selecting means associated with said punching apparatus for choosing a particular predetermined coded character, perforations representative of which it is desired to punch in the tape on actuation of said punching apparatus, actuating means operably associated with said punching apparatus for causing the punching apparatus to punch the tape with the perforations representative of the chosen character, and tape advance mechanism for moving the tape through the punching apparatus the same distance on each actuation of said actuating means at the start of a punching operation and before each character is punched in the tape due to actuation of said actuating means comprising a shaft rotatably mounted on said base, a feed pinwheel secured to said shaft for rotation therewith, said pinwheel being adapted to engage and advance the tape on rotation of said pinwheel, a ratchet wheel also secured to said shaft operable on rotation to cause rotation of said shaft, and an advance pawl for causing rotation of said ratchet wheel between successive punchings of said tape.

3. Structure as claimed in claim 2 including spring bias means acting between said advance pawl and actuating means to urge the pawl into contact with said ratchet wheel, pin and slot means acting between the pawl and actuating means for movably mounting the pawl on the actuating means, and a pawl stop pin located adjacent said ratchet wheel to limit rotation of the ratchet wheel between punchings of the tape.

4. A portable manual tape perforator comprising a base for supporting a tape to be perforated, punching apparatus supported by said base operable to punch groups of perforations in the tape, which perforations represent predetermined coded characters, character selecting means associated with said punching apparatus for choosing a particular predetermined coded character perforations representative of which it is desired to punch in the tape on actuation of said punching apparatus, actuating means operably associated with said punching apparatus for causing the punching apparatus to punch the tape with the perforations representative of the chosen character, tape advance mechanism for moving the tape through the punching apparatus on actuation of said actuating means at the start of a punching operation and before each character is punched in the tape due to actuation of said actuating means, and delete means associated with said punching apparatus and operable to cause said punching apparatus to punch the tape to produce perforations representative of a delete character without advancing the tape.

5. A tape perforator as claimed in claim 4 wherein said delete means comprises a lever pivotally secured to said base, which lever is pivotal independently of said actuating means and advance mechanism to actuate said punching apparatus to produce a delete character in the tape.

6. A portable manual tape perforator comprising a base for supporting a tape to be perforated, punching apparatus supported by said base operable to punch groups of perforations in the tape which perforations represent predetermined coded characters, character selecting means associated with said punching apparatus for choosing a particular predetermined coded character perforations representative of which it is desired to punch in the tape on actuation of said punching apparatus, actuating means operably associated with said punching apparatus for causing the punching apparatus to punch the tape with the perforations representative of the chosen character, and tape advance mechanism for moving the tape through the punching apparatus on actuation of said actuating means at the start of a punching operation and before each character is punched in the tape due to actuation of said actuating means including a shaft rotatably mounted on said base, a feed pin wheel secured to said shaft for rotation therewith, said pin wheel being adapted to engage and advance the tape on rotation of said pin wheel, a ratchet wheel also secured to said shaft operable on rotation to cause rotation of said shaft, and an advance pawl for causing rotation of said ratchet wheel between successive punchings of said tape.

7. Structure as claimed in claim 6 including spring bias means acting between said advance pawl and actuating means to urge the pawl into contact with said ratchet wheel, pin and slot means acting between the pawl and actuating means for movably mounting the pawl on the actuating means, and a pawl stop pin located adjacent said ratchet wheel to limit rotation of the ratchet wheel between punchings of the tape.

8. A tape perforator comprising a support for supporting a tape to be perforated, apparatus operably associated with the tape supported by said support for punching selected groups of perforations in the tape which perforations represent predetermined coded characters, means associated with said apparatus and operable to advance the tape a fixed distance at the start of a punching cycle of said apparatus, and delete means operably associated with the tape supported by the support for punching perforations representing a delete character in the tape.

9. A tape perforator comprising a support for supporting a tape to be perforated, means operably associated with said tape supported by said support for punching groups of transversely spaced apart perforations in the tape which perforations represent predetermined coded characters, and means operably associated with the apparatus for punching perforations in the tape for advancing the tape the same fixed distance at the start of each punching operation immediately preceding the punching of each group of perforations in response to the starting of the punching operation.

References Cited in the file of this patent

UNITED STATES PATENTS

| | | |
|---|---|---|
| 1,429,719 | Day | Sept. 19, 1922 |
| 1,757,914 | Long | May 6, 1930 |
| 1,812,620 | Braitmayer | June 30, 1931 |
| 2,411,794 | Lake | Nov. 26, 1946 |
| 2,655,215 | Kertes | Oct. 13, 1953 |
| 2,878,870 | Zum Bahlen et al. | Mar. 24, 1959 |